UNITED STATES PATENT OFFICE.

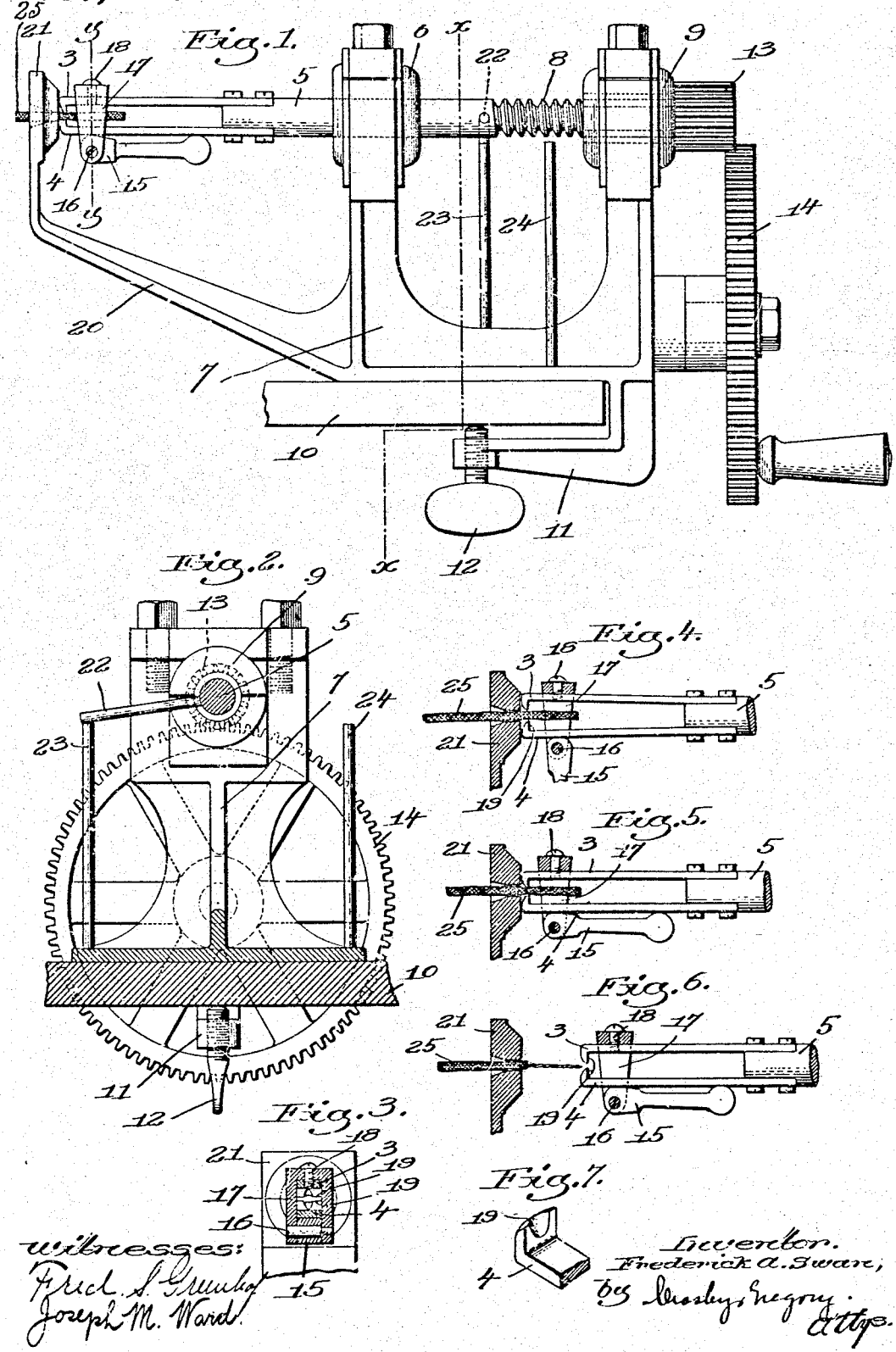

FREDERICK A. SWAN, OF CLIFTONDALE, MASSACHUSETTS.

WIRE-STRIPPING DEVICE.

967,998.  Specification of Letters Patent.  Patented Aug. 23, 1910.

Application filed September 29, 1909. Serial No. 520,078.

*To all whom it may concern:*

Be it known that I, FREDERICK A. SWAN, a citizen of the United States, residing at Cliftondale, county of Essex, and State of Massachusetts, have invented an Improvement in Wire-Stripping Devices, of which the following description, in connection with the accompanying drawing, is a specification, like characters on the drawing representing like parts.

This invention has for its object to provide a novel device for rapidly and effectively stripping insulation from wire. In order to secure an insulated wire to a binding post, it is necessary to strip the insulation from the wire, and it is now the common practice for workmen to use a jack-knife for this purpose. This operation of stripping the wire with a jack-knife takes some time, and unless the workman is careful, he does not thoroughly clean the wire.

The object of my invention is to provide a novel device which can be readily carried from one place to another and which can be readily clamped to a bench or table and which will rapidly and effectively strip the insulation from the ends of an insulated wire, and at the same time leave the stripped wire clean and in proper condition to be secured to the binding post.

One embodiment of my invention will first be described and then the novel features thereof will be pointed out in the appended claims.

In the drawings, Figure 1 is a side view showing the device; Fig. 2 is a section on the line x—x, Fig. 1; Fig. 3 is a section on the line y—y, Fig. 1; Figs. 4, 5 and 6 are views of the stripping jaws showing different positions of the jaws; Fig. 7 is an enlarged perspective view of one of the jaws.

My improved device as herein shown comprises a pair of wire-stripping jaws adapted to grasp the wire and cut into the insulation, and means to rotate the jaws relative to the wire and at the same time move them longitudinally of the wire thereby completing the wire-stripping operation. The wire-stripping jaws are shown at 3 and 4, respectively, and they are both carried by a spindle 5 adapted both to rotate and to move longitudinally. This spindle is shown as rotatably sustained in a bearing 6 which is carried by a suitable frame 7, and said spindle has a screw-threaded portion 8 that screw-threads through a nut 9 also carried by the frame 7.

The frame 7 may be of any suitable shape adapted to sustain the parts, but I will preferably make it of a construction so that it can be readily clamped to a table 10 or other support, and for this purpose I have shown the frame 6 provided with the clamping arm 11 adapted to embrace the edge of the table and carrying a clamping-screw 12 by which the frame is clamped to the table. The spindle 5 has fast therewith a gear 13 which meshes with and is driven by a driving gear 14 which is journaled to the frame 7 and which may be operated either by hand or by power. The pinion 13 is a long-faced pinion so that the teeth thereof remain in mesh with the teeth of gear 14 in any longitudinal position of the spindle 5.

Provision is made for clamping the jaws to the wire during the stripping operation and in the present embodiment of my invention this is accomplished by a clamping arm 15 that is pivoted at 16 to a yoke 17 that embraces the two jaws and is secured to the jaw 3 by means of the screw 18. The shanks of the jaws are made resilient and the clamping member 15 has the cam-shaped end so that when it is thrown from the position shown in Fig. 4 into the position shown in Figs. 5 and 6, it will force the jaws together. The jaws are made with the cutting edges 19 which are preferably slightly hollow so that when the jaws are closed together, they will bite into the insulation and will fit around the wire.

The frame 7 is provided with an arm 20 which carries at its end a wire-guiding device 21 having an aperture through which the insulated wire may be passed and which operates to hold the wire while it is being stripped. The shaft is provided with a stop-arm 22 which engages one or another of the two stops 23 and 24 thereby to limit the extent of rotary movement of the spindle.

The operation of the device will be apparent from the foregoing description, but briefly stated is as follows: Assuming that the spindle is in the position shown in Fig. 1, the end of the wire 25 to be stripped is inserted through the aperture in the wire guide 21, as seen in Fig. 4, and is located between the jaws 3 and 4. The clamping arm 15 is then thrown into the position shown in Fig. 5 thereby clamping the jaws against the wire and causing the cutting edges 19 thereof to cut into the insulation. The driving wheel 14 is then rotated thereby rotating the spindle, and this rotation of the spindle serves to move it longitudinally through the bearings owing to the screw-threaded engagement between the portion 8 of the spindle and the nut 9. During this combined rotary and longitudinal movement of the spindle, the stripping jaws 3 and 4 strip the insulation from the wire, as will be obvious, thus leaving the wire in the condition shown in Fig. 6. The stop 24 serves to limit the backward movement of the spindle in the same manner that the stop 23 limits the forward movement thereof.

It will be seen from the foregoing that the operation of stripping the wire involves merely inserting the end of the wire the proper distance through the wire guide 21 and then turning the clamping arm 15 and rotating the driving wheel 14.

I have shown herein one embodiment only of the invention and therefore do not wish to be limited to the constructional details illustrated.

Having fully described my invention, what I claim as new and desire to secure by Letters Patent is:—

1. In a device for stripping insulation from wire, the combination with a wire guide, of a pair of stripping jaws, and means to rotate said jaws and simultaneously move them in a direction longitudinally of the wire.

2. In a device of the class described, the combination with a pair of stripping jaws, of means to clamp the jaws onto the wire, means to rotate said jaws, and means to move the jaws simultaneously in a direction longitudinally of the wire.

3. In a device of the class described, the combination with a spindle, of a pair of stripping jaws carried by the spindle, means to clamp the jaws together, and means to rotate said spindle and simultaneously move it longitudinally.

4. In a device of the class described, the combination with a frame, of a wire guide carried thereby, a spindle rotatably mounted in the frame, a pair of stripping jaws carried by the spindle, means to clamp said jaws onto a wire to be stripped, and means to rotate the spindle and simultaneously give it a longitudinal movement.

5. In a device of the class described, the combination with a frame, of a wire guide supported thereby, a spindle journaled in said frame, said spindle having a screw-threaded engagement with the frame, a pair of stripping jaws carried by the spindle, and means to rotate the spindle, said screw-threaded engagement between the spindle and frame operating to move the spindle longitudinally during its rotation.

6. In a device of the class described, the combination with a pair of stripping jaws, of means to clamp the jaws onto the wire to be stripped, jaw-rotating mechanism, and means to move the jaws in a direction longitudinally of the wire while they are rotating.

7. In a device for stripping insulation from wire, the combination with a wire guide, of a pair of stripping jaws, jaw-rotating mechanism, and means to give a relative movement of the jaws and wire guide in a direction longitudinally of the wire while the jaws are rotating.

In testimony whereof, I have signed my name to this specification, in the presence of two subscribing witnesses.

FREDERICK A. SWAN.

Witnesses:
 Louis C. Smith,
 Thomas J. Drummond.